United States Patent [19]

Kito et al.

[11] Patent Number: 4,650,647
[45] Date of Patent: Mar. 17, 1987

[54] APPARATUS FOR REMOVING ACID CONSTITUENTS FROM WASTE-GAS

[75] Inventors: Shigehiro Kito, Nishinomiya; Akira Tamaki, Ibaraki; Kazuo Oyama, Osaka, all of Japan

[73] Assignee: Takuma Co., Ltd., Osaka, Japan

[21] Appl. No.: 678,765

[22] Filed: Dec. 5, 1984

[51] Int. Cl.⁴ .................. B01D 50/00; B01D 41/02; B01D 46/30
[52] U.S. Cl. .................. 422/169; 422/178; 422/219; 422/238; 55/5; 55/126; 55/262; 55/338; 55/474; 55/479
[58] Field of Search .................. 422/169–172, 422/177, 178, 219, 238; 55/5, 124, 126, 262, 338, 474, 479, 77, 79, 390

[56] References Cited

U.S. PATENT DOCUMENTS

| | | | |
|---|---|---|---|
| 931,515 | 8/1909 | Sprague | 55/262 |
| 1,221,505 | 4/1917 | Bradley et al. | 55/5 |
| 1,291,745 | 1/1919 | Bradley | 55/5 |
| 4,044,102 | 8/1977 | Muraki et al. | 55/474 |
| 4,308,036 | 12/1981 | Zahedi et al. | 55/126 |
| 4,319,890 | 3/1982 | Teller et al. | 55/124 |
| 4,534,778 | 8/1985 | Carré et al. | 55/474 |

FOREIGN PATENT DOCUMENTS

| | | | |
|---|---|---|---|
| 56984 | 5/1979 | Japan | 422/169 |
| 104084 | 8/1979 | Japan | 55/126 |
| 81718 | 6/1980 | Japan | 55/474 |
| 129127 | 10/1980 | Japan | 55/474 |
| 58-42014 | 9/1983 | Japan . | |

Primary Examiner—David L. Lacey
Attorney, Agent, or Firm—Sandler & Greenblum

[57] ABSTRACT

An apparatus for removing acid constituents such as HCl and/or $SO_x$ from the waste-gas generated by furnaces, incinerators and the like wherein the calcium-containing powder material is blown into a waste-gas duct to form a lean fluidized flow until it reaches a vertical moving bed filter having two louvered walls between which granular packings are filled. The process for removing the acid constituents is accomplished by chemisorption which occurs first in the duct and then in the filter bed. A recycled use of the powder is preferred. The filtered waste-gas is further purified by an electrostatic precipitator. The use of a moving bed filter permits the use of a greater amount of calciumaceous powder relative to the acid gases without increasing the electrical load on the electrostatic precipitator.

8 Claims, 5 Drawing Figures

APPARATUS FOR REMOVING ACID CONSTITUENTS FROM WASTE-GAS

BACKGROUND OF THE INVENTION

1. Field of the Invention

This invention relates to an apparatus for removing acid constituents such as HCl and so-called $SO_x$ from the waste-gas generated in a combustion apparatus such as a combustion furnace, an incinerator and the like which burns materials containing elements of Cl and/or S, by the use of calcium-containing chemisorbent. It is intended by the term "chemisorb" to mean chemically absorb or adsorb, or absorb or adsorb with simultaneous chemical reaction.

2. Discussion of Background and Material Information

It has been known that the waste-gas generated by refuse incinerators includes a small amount of HCl gas originating from Cl-containing organic polymers such as polyvinyl chloride and polyvinylidene chloride. Again, waste-gas resulting from combustion of sulfur-containing materials is invariably contaminated by $SO_x$ or gaseous oxidized products of sulfur, with, in general, about 99 percent thereof being $SO_2$ and the rest, $SO_3$.

There are two types of gas purification processes of the wet-process and the dry-process. The former encompasses scrubbing the gas with an aqueous solution or suspension of such a chemisorbent as NaOH, $Na_2SO_3$, $CH_3COONa$, $NH_3$, $Ca(OH)_2$, $Mg(OH)_2$, $MgSO_3$, or basic aluminum sulfate. Whereas the wet-process has the merits or advantages of intensive removability, easy workability and scarceness of environmental pollution, in general the equipment required for this purpose is rather complex and expensive and requires a considerable amount of space for its construction. On the other hand, the dry-process is advantageous in that it is in smaller in size, less expensive to construct, and is simpler in operation.

The chemisorbants used in the dry-process are mostly calcium compounds mainly for economical reasons, although aluminum coated with sodium oxide, hydrated manganese oxide and copper oxide were once claimed to be effective. Of the calcium compounds, calcium hydroxide, calcium oxide and calcium carbonate are by far the most suitable in view of availability, effectiveness and economy. Among them, calcium carbonate is somewhat different from the others in that it is a salt and less reactive. However, the occurrence of the following chemical reactions at higher temperatures of about 800° to 1000° C. makes choice among them less important.

$$CaCO_3 \rightarrow CaO + CO_2 \quad (1)$$

$$Ca(OH)_2 \rightarrow CaO + H_2O \quad (2)$$

Care should be taken in the case of $CaCO_3$, therefore, to maintain these temperatures for sufficient time to enable the reaction (1) to proceed.

In a typical conventional dry-process using calcium hydroxide as the chemisorbent, particulate calcium hydroxide suspended in air is blown into the duct of waste-gas maintained at higher temperatures, to form a lean fluidized flow within the duct which moves downstream. During its migration a substantial amount of chemisorption of the acid gases occurs, and eventually reaches an electrostatic precipitator wherein the solid powder is electrostatically removed. In the case where calcium carbonate is used as the chemisorbent, it is preferable to charge the powder into higher temperature zones of above 800° C. to increase the rate of the aforementioned reaction (1).

The amount of the calcium compounds used was at most two times the stoichiometric or chemical equivalent because excess amounts incur squandering of electrical energy and are not economical. The extent of dechlorination is commonly 40 to 60%, the same being the case for desulfurization.

It will be desirable that the extent of removal of the acid constituents is increased without increased load for the electrostatic precipitator.

SUMMARY OF THE INVENTION

It is, accordingly, an object of this invention to provide an apparatus for removing the acid constituents more satisfactorily from the waste-gas by the use of particulate calcium compounds without increased load for the electrostatic precipitator.

Another object of this invention is to provide an apparatus for removing the acid constituents from the waste-gas which does not use aqueous solution or dispersion.

To accomplish these and other objects, this invention contemplates an apparatus wherein powder consisting of one or more species of the calcium compounds is blown into a duct for the waste-gas to form a lean fluidized flow moving downstream until it reaches a vertical moving bed filter located cross wise with respect to the direction of the waste-gas. During this period of time the chemisorption proceeds to a substantial extent. The powder suspending gas is filtered with simultaneous chemisorption by the moving bed filter having louvered walls for the gas passage and a layer of granular particles which, in turn, capture the calcium by carrying out the chemisorption in steps, i.e., in the duct and in the filter bed, permits the reaction to proceed closer to completion so that a greater stoichiometric amount of calcium compound then heretofore thought possible can be introduced into the moving bed filter without an increased load on the electrostatic precipitator. Inasmuch as the vertical moving bed filter can be of almost any width, an uneven gas flow therethrough is essentially avoided.

DETAILED DESCRIPTION OF THE PREFERRED EMBODIMENT

Figure 2:
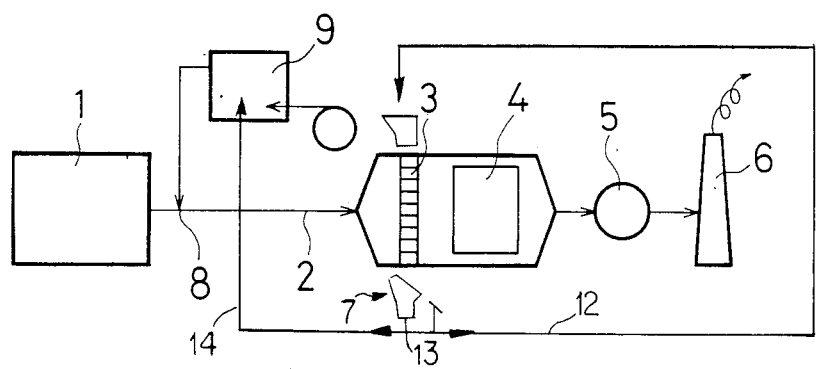
FIG. 2 is a generalized flow diagram showing how the apparatus of this invention is integrated into a full purification system.

Referring first to FIG. 2, which exemplifies a general arrangement of equipments, the waste-gas generated in a refuse incinerator 1 flows to the right through a duct 2, and into this duct the particulate calcium compound or compounds processed elsewhere to an air suspension is added at an appropriate location designated as 8. The resultant air suspension flows downstream in a fluidized state and reaches a moving bed filter 3. The chemisorption reaction takes place in large part in duct 2, and further proceeds in moving bed filter 3, in the presence of the calciumaceous powder captured and retained therein. The waste-gas substantially freed from large-size particles and the acid gas leaving the filter 3, further moves to an electrostatic precipitator 4 wherein small-size particles passed through filter 3 uncaptured are electrostatically removed. The waste-gas is then drawn by the exhaust 5 to stack 6 and released therefrom to the air.

Referring back to FIG. 1, there is schematically depicted the integral part of this invention in more detailed way. The waste-gas at a temperature of, about 600° C. for $Ca(OH)_2$ and above 800° C. for $CaCO_3$ in the case of $SO_x$ removal, whereas about 300° to 400° C. in the case of HCl removal, enters the duct 2 from left to right along the arrow. The duct 2 is provided with a plurality of holes 8a perforated through the wall thereof which open into an annular roofed area having a C-shaped cross section which opens inwardly. The two open side edges of the roofed area are secured airtightly to the outer surface of the duct to form an annular pathway 8b for the air suspension. The annular pathway is, in turn, connected to a dust former 9 through pipe 8c. The dust former 9 consists essentially of a blower 9a and a dusting box 9b, the boosted air from the former being used to make up air suspension of the particulate calcium compound under severely turbulent condition. The pulverizer of the calcium compound is not shown because it relates little to this invention, except the charge chute 9c is shown in the figure.

The flow of the waste-gas in duct 2 is made sufficiently turbulent to maintain a fluidized state and to prevent sedimentation of the powder. A substantial part of the chemisorption occurs within duct 2, because a greater amount of the calcium-aceous powder can be used due to the use of the moving filter bed without causing more load to the electrostatic precipitator. The waste-gas suspending the powder then reaches the vertical moving bed filter 3 wherein the powder is filtered off from the gas by the materials used for packing the bed which includes captured powder in addition to conventional natural and artificial packing materials as discussed below. The second step or finishing chemisorption reaction, further occurs in the bed, and, in fact, in more vigorous way, since the acid components in the waste-gas have more chances to make contact with the captured powder.

The moving bed filter 3 consists essentially of a moving bed 3a, louvered front and rear walls 3b1, 3b2, adjustable speed charging valve 3c and discharging valve 3d (in the figure, both of so-called star gate valve type), and a hopper 3e. The louvers of the walls 3b1 and 3b2 have rising slopes from inside of the bed to outside to prevent spilling out of the particulate mass constituting the bed. It is to be noted that the distance between walls 3b1 and 3b2 referred to as depth of the bed is deeper at the upper part of the bed wherein less calciumaceous powder is retained because exposure of the bed to the powder-suspending gas is shorter than in the lower part, narrow of the bed wherein the exposure is made for longer time, and the powder content is more.

Many known materials of natural and artificial origin can be used satisfactorily as the packings for the moving bed. Among them, however, gravel is one of the most appropriate in view of the cost and its irregular shape and widely distributed size for retaining the powder. The moving bed constituting mass moving down by gravity and leaving from the discharging valve 3d is introduced into a mechanical screen 7 and separated to the oversize consisting practically of packings and the undersize consisting mainly of the partly reacted powder. For simplicity, driving means for the sieve 7a is not shown. The receiving funnel 7b collects the undersize and drops it out through chute 7c. On the other hand, the oversize leaves the sieve at the lowermost part thereof designated as 7d. Overhung weir 7e is provided to level off the mass on the sieve. The moving or falling speed of the moving bed should be fast enough for the calciumaceous powder not to spill out from the louvered walls and also not to exhibit excessive pressure loss, and slow enough for the moving bed to contain a sufficient amount of the powder, to prevent the powder from passing uncaptured through the intergranular space. It is of course advantageous that enough powder is added, in advance, to the packings in hopper 3e to prevent short-passing of the powder-suspending waste-gas at the upper part of the filter bed 3a.

Figure 3:
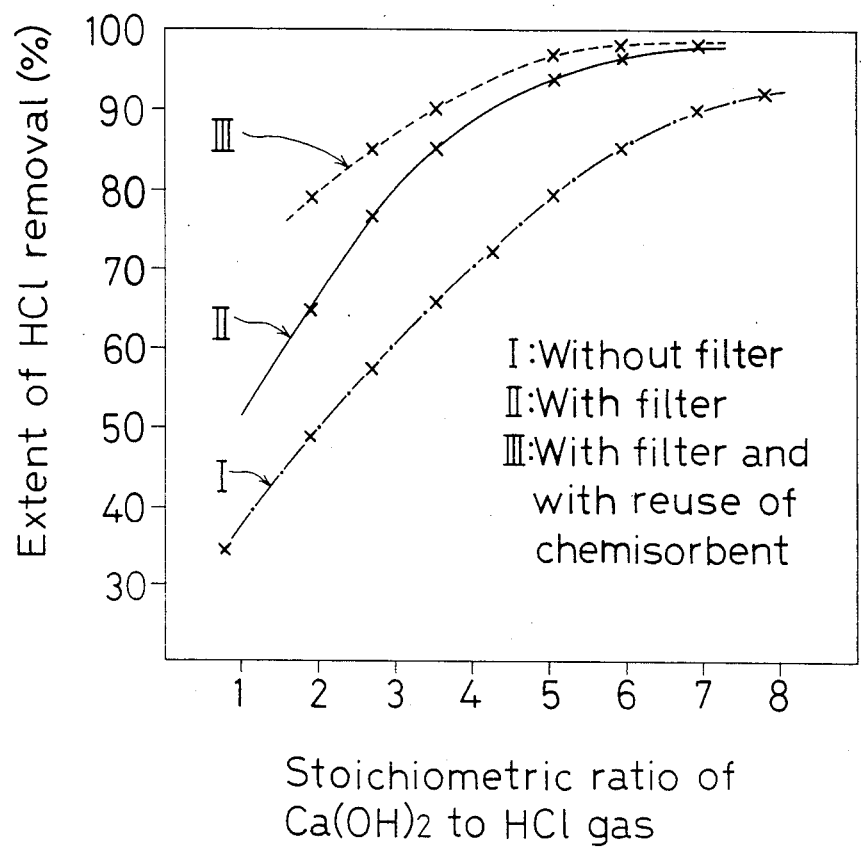
FIG. 3 is a graphical representation showing the relationships between the extent of removal of HCl as the acid constituent and the stoichiometric ratio (chemical equivalent) of $Ca(OH)_2$ to HCl.
Figure 4:
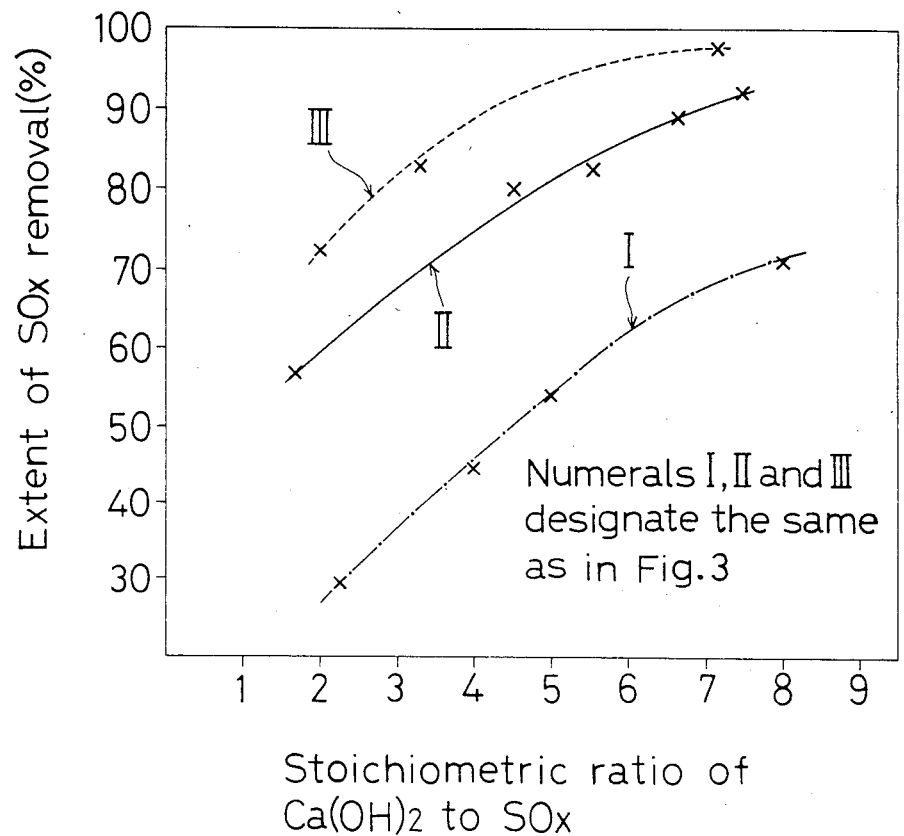
FIG. 4 is a graphical representation denoting the relationships between the extent of removal of $SO_x$ as the acid constituent and the stoichiometric ratio (chemical equivalent) of $Ca(OH)_2$ to $SO_x$.

In FIGS. 3 and 4, there are shown the relations between the extents of removal of the acid constituent and the stoichiometric ratio of $Ca(OH)_2$ to the acid constituent, the differences being that HCl is used in the former case and $SO_x$, in the latter case, and the temperatures are 350° C. and 700° C. for respective cases. The curved line I represents the result in the case of no moving bed filter, the curved line II, the result in the presence of the moving bed filter, and the curved line III, half of the undersize is added to the fresh powder at the dusting box 9b, from the charge chute 9c so that the suspending powder is increased by that amount of about 1.5 folds. In FIG. 3, when the value of the abscissa is 4, the ordinates of the curved lines I, II, and III are 70%, 87%, and 93%, respectively. Whereas when the abscissa designates 7, the curved lines I, II, and III give the ordinates of 88%, 97%, and 98%, respectively. In a similar way, in FIG. 4, when the value of the abscissa is 4, the ordinates of the curved lines I, II, and III are 45%, 75% and 90%, respectively, and when the abscissa is increased to 7, the ordinates of the curved lines I, II, and III are, respectively, 68%, 92%, and 98%. The results indicate the effect of providing the moving bed filter and increasing, at the same time, the stoichiometric ratio of the calcium compound straight-forwardly.

The packings used in the moving bed such as gravel have, in usual, properties sufficiently tolerable against abrasion and cracking, so that they can be used repeatedly by such a way as of recharging the oversize resulting from the screen 7 into the hopper 3e. As shown in FIG. 2, the apparatus includes means for recycling oversized particles to the moving bed through conduit 12 which conveys the oversized particles to the source of packing material. The apparatus also includes means for recycling at least part of the undersized particles through conduit 13 which communicates between the means for classifying and the source of packing material. In addition, the apparatus may also include means for recycling at least part of the undersized particles through conduit 14 to the duct in communication between the means for classifying and the means for forming a suspension.

Figure 5:
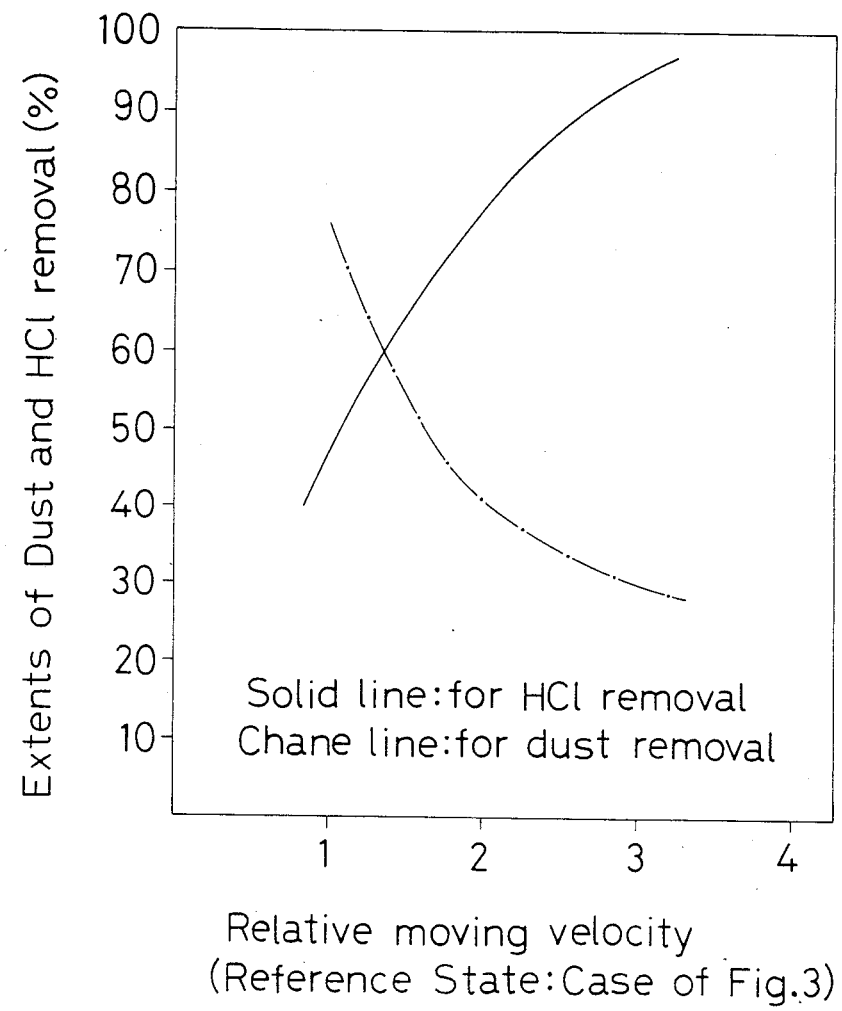
FIG. 5 is a graph showing the general trend of the extents of powder removal and of HCl gas removal with an increased moving velocity of the packed moving bed for the case of FIG. 3.

As is clear from the above description, the moving bed filter 3 has dual functions of filtration or powder removal and, of chemisorption. However, as can be seen in FIG. 5, the extent of powder removal reduces with an increased moving velocity of the moving bed, on the contrary, the extent of HCl removal increases with the increased moving velocity. Therefore, care should be taken to choose an approprite moving velecity.

Figure 1:
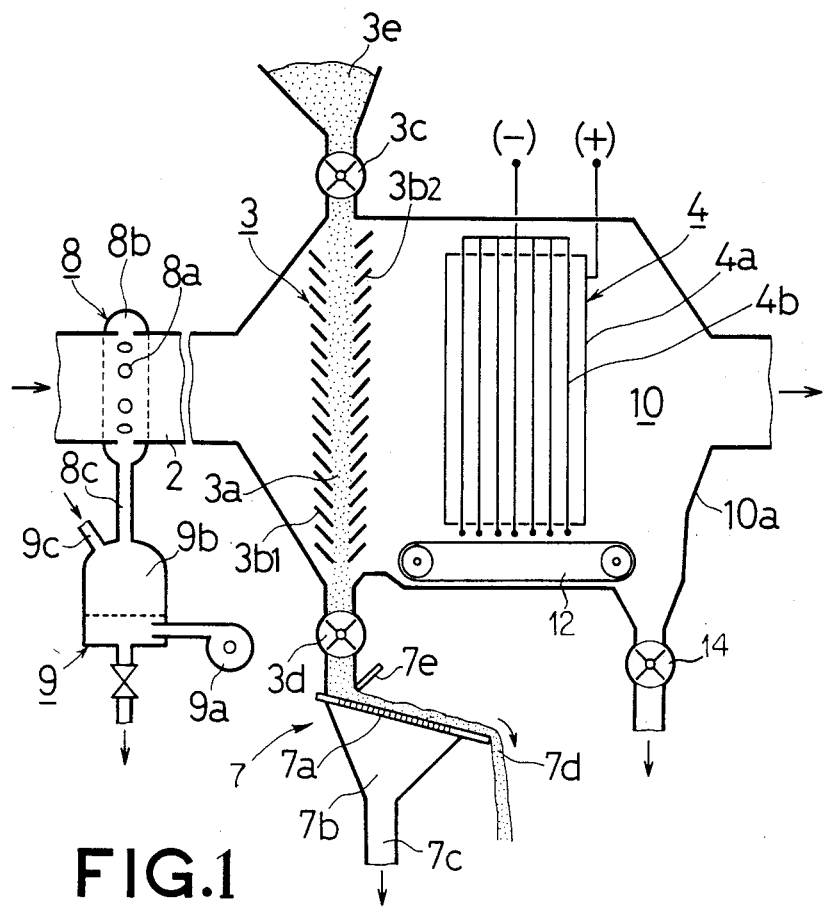
FIG. 1 is an elevational schematic illustration of the separation apparatus with the near side walls taken off to show the inside construction.

The waste-gas leaving the moving bed filter which is substantially freed from the acid constituents and the particulate mass, then proceeds to the electrostatic precipitator 4 wherein, as well known, smaller-size particles of less than about 20,000 nm in diameter are effectively removed. The apparatus shown in FIG. 1 is intended to represent a conventional Hot Cottrel type having parallel plates 4a as collecting electrodes and a number of rods 4b placed midway between the collecting electrode plates as discharging electrodes. The conveyor 12 just below the electrostatic precipitator 4 is used to carry out the collected dust through the discharging valve 14 from the chamber 10 which encloses both the moving bed 3a and the electrostatic precipitator 4 with casing 10a, to reduce the dust trouble in the working environment.

The apparatus shown in FIG. 1 and described above is of horizontal type in which the powder-suspending waste-gas flows horizontally and the vertical moving bed filter mentioned above is built crosswisely to the flow. The alternative vertical version in which the powder-suspending waste-gas flows vertically to a horizontal moving bed filter, is practicable with appropriate design change. In fact, the horizontal moving bed filter through which a gas passes vertically, is more common in the chemical industry, and may afford better performance in the respect that the gravitational force acts just perpendicular to the bed, and at least in principle, the calciumaceous powder is captured and retained evenly throughout the horizontal bed area, provided that the bed depth is equal everywhere and the packings of the bed are feeded therefor and drawn therefrom uniformly. It is, of course, very difficult to satisfy these provisions. The vertical version described above is preferred in that the bed depth is substantially invariable with time as a result of the presence of the two sustaining louvered walls.

While this invention has been particularly shown and described with reference to a preferred embodiment thereof, it is to be understood by those skilled in the art that the foregoing and other changes on form and details can be made without departing from the spirit and scope of this invention.

What is claimed is:

1. An apparatus for removing acid constituents from hot waste-gas comprising:

(a) a substantially horizontal duct connected between a combustion apparatus and a housing having a greater cross-sectional area than said duct, said duct being adapted to convey hot waste-gas from said combustion apparatus through said housing, said duct having an interior defined by an elongate surface provided with a series of orifices in said surface around a section of said duct which communicate between said interior and an annular chamber fitted around said section of said duct;

(b) means for forming a suspension of air and powder including at least one species of calcium compound selected from the group consisting of calcium hydroxide, calcium oxide, and calcium carbonate in communication with a source for said powder and connected by a conduit to said annular chamber fitted around said duct at a suspension charging location, so that chemisorption of acid constituents in said gas by the powder takes place downstream from said location in said duct; and (c) a moving bed filter of packing material which passes transversely through said housing downstream from said location so as to capture said powder and simultaneously chemisorb any remaining acid constituent in said waste-gas wherein said filter includes an entrance and an exit, and is provided with a means for introducing said packing material to said filter in communication with a source of said packing material at said entrance and a means for discharging said packing material from said filter at said exit end, and wherein said filter has a cross-sectional area which decreases continuously from said entrance end to said exit end.

2. An apparatus according to claim 1 wherein said moving bed filter is bounded by a pair of opposite walls having louvers which slope from inside of the bed to outside of the bed upwardly towards said entrance end to permit the passage of waste-gas.

3. An apparatus according to claim 2 wherein said packing material in said moving bed is gravel.

4. An apparatus according to claim 3 wherein said means for discharging communicates with a means for classifying oversized and undersized particles of packing material.

5. An apparatus according to claim 4 further comprising means for recycling oversized particles to said moving bed in communication with said means for classifying and said source of packing material.

6. An apparatus according to claim 5 further comprising means for recycling at least part of the undersized particles to said moving bed in communication with said means for classifying and said source of packing material.

7. An apparatus according to claim 6 further comprising means for recycling at least a part of the undersized particles to said duct in communication with said means for classifying and said means for forming a suspension.

8. An apparatus according to claim 5 further comprising means for recycling at least part of the undersized particles to said duct in communication with said means for classifying and said means for forming a suspension.

* * * * *

UNITED STATES PATENT AND TRADEMARK OFFICE
CERTIFICATE OF CORRECTION

PATENT NO. : 4,650,647

DATED : March 17, 1987

INVENTOR(S) : Shigehiro KITO et al.

It is certified that error appears in the above-identified patent and that said Letters Patent is hereby corrected as shown below:

In the Abstract, at line 2, delete "the".

In the Abstract, at line 3, change "furnaces,incinerators" to ---furnaces, incinerators---.

At column 2, line 38, insert ---powder in the intergranular space--- after "calcium" and before "by".

At column 2, line 42, change "then" to ---than---.

At column 3, line 47, change "calcium-accous" to ---calciumaceous---.

At column 3, line 56, delete "," after "reaction".

At column 3, line 57, insert ---a--- after "in" and before "more".

At column 4, line 3, change "lower" to ---lower, narrow---.

At column 4, line 56, change "straight-forwardly" to ---straightforwardly---.

At column 4, line 4, delete "narrow".

At column 4, line 58, change "have, in usual" to ---usually have---.

Signed and Sealed this

Ninth Day of May, 1989

Attest:

DONALD J. QUIGG

Attesting Officer

Commissioner of Patents and Trademarks